United States Patent [19]

Borner et al.

[11] Patent Number: 5,419,193
[45] Date of Patent: May 30, 1995

[54] WHEEL BALANCER IN WHICH A SUB-HOUSING CARRYING A MAIN SHAFT IS PIVOTAL FROM A HORIZONTAL TO A VERTICAL POSITION FOR ALIGNING A WHEEL ON THE MAIN SHAFT

[75] Inventors: Willy Borner, Cupertino; Bernard Jackson, Los Gatos; Gordon F. Schmeisser, Santa Cruz, all of Calif.; John V. Rochford, Meelick; Duncan W. McInnes, Castleconnell, both of Ireland

[73] Assignee: Interbalco AG, Zug, Switzerland

[21] Appl. No.: 20,156

[22] Filed: Feb. 19, 1993

[30] Foreign Application Priority Data

Feb. 20, 1992 [IE] Ireland ................................ 0534/92

[51] Int. Cl.6 ............................................ G01M 1/22
[52] U.S. Cl. ............................................ 73/462; 73/471
[58] Field of Search ................ 73/460, 462, 471, 472, 73/474; 157/19

[56] References Cited

U.S. PATENT DOCUMENTS

| 2,349,552 | 5/1944 | Holmes | 73/459 |
| 2,532,056 | 11/1950 | Carrigan | 73/459 |
| 3,922,922 | 12/1975 | Goebel | 73/462 |
| 4,193,305 | 3/1980 | Hunter | 73/462 |

*Primary Examiner*—Hezron E. Williams
*Assistant Examiner*—Helen C. Kwok
*Attorney, Agent, or Firm*—Claude A. S. Hamrick

[57] ABSTRACT

A wheel balancer comprises a main housing which supports a sub-housing. A main shaft to which a wheel to be balanced is coupled is rotatable in the sub-housing. The sub-housing is pivotally connected to the main housing by a pivot shaft which defines a horizontal main pivot axis extending transversely of the rotational axis of the main shaft. The sub-housing is pivotal from a horizontal position to a vertical position with the main shaft extending upwardly of the sub-housing to facilitate coupling of the wheel to the main shaft.

16 Claims, 10 Drawing Sheets

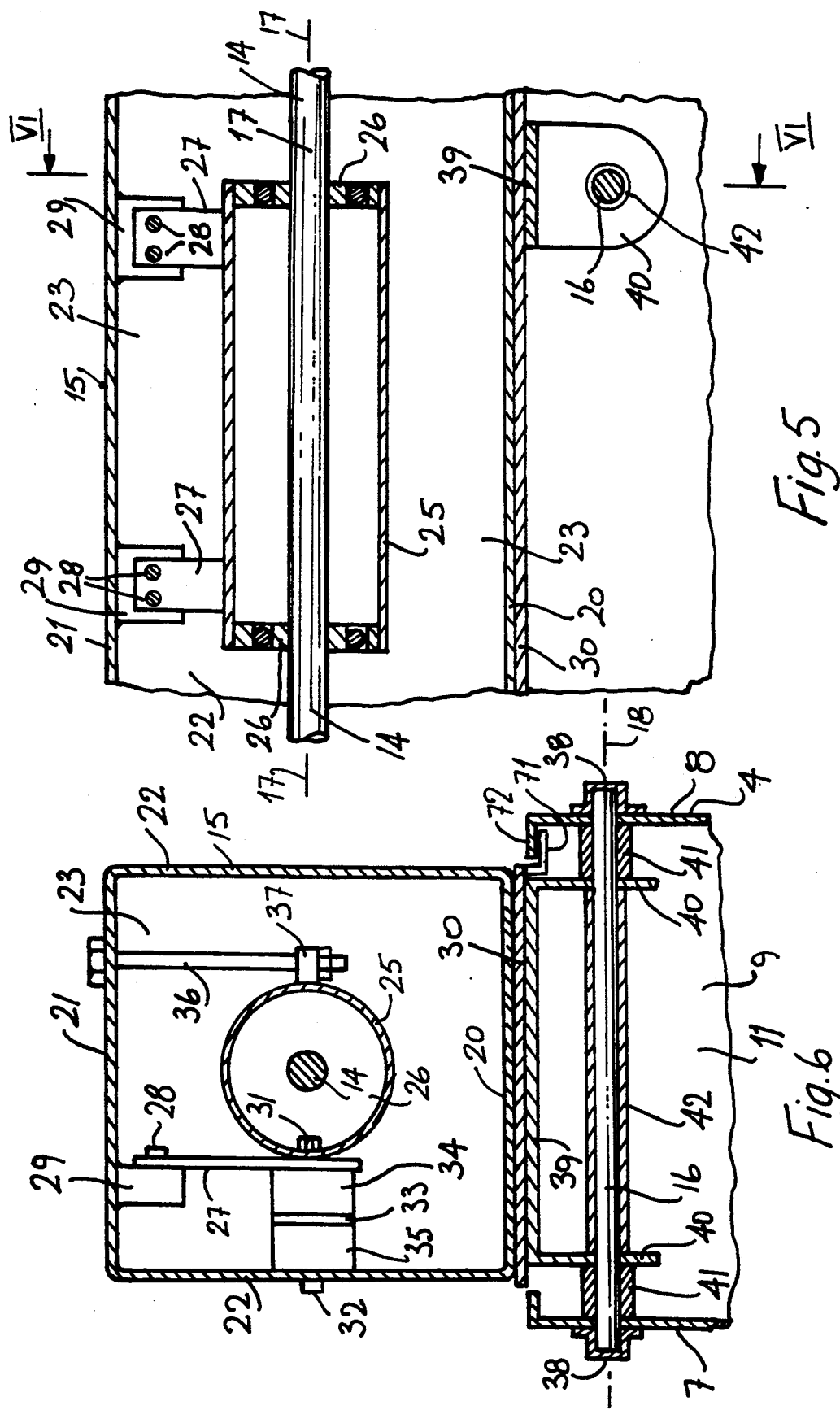

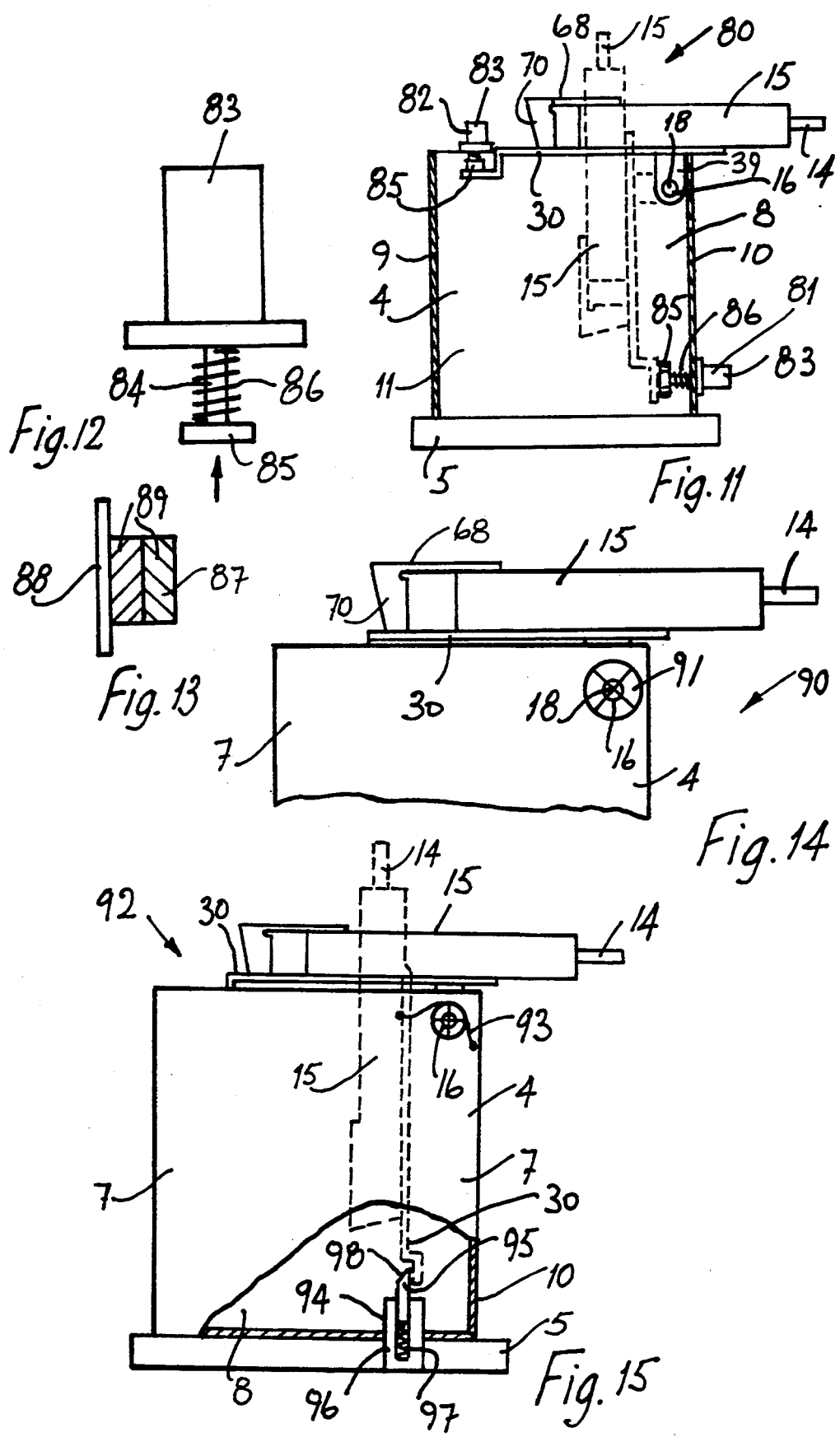

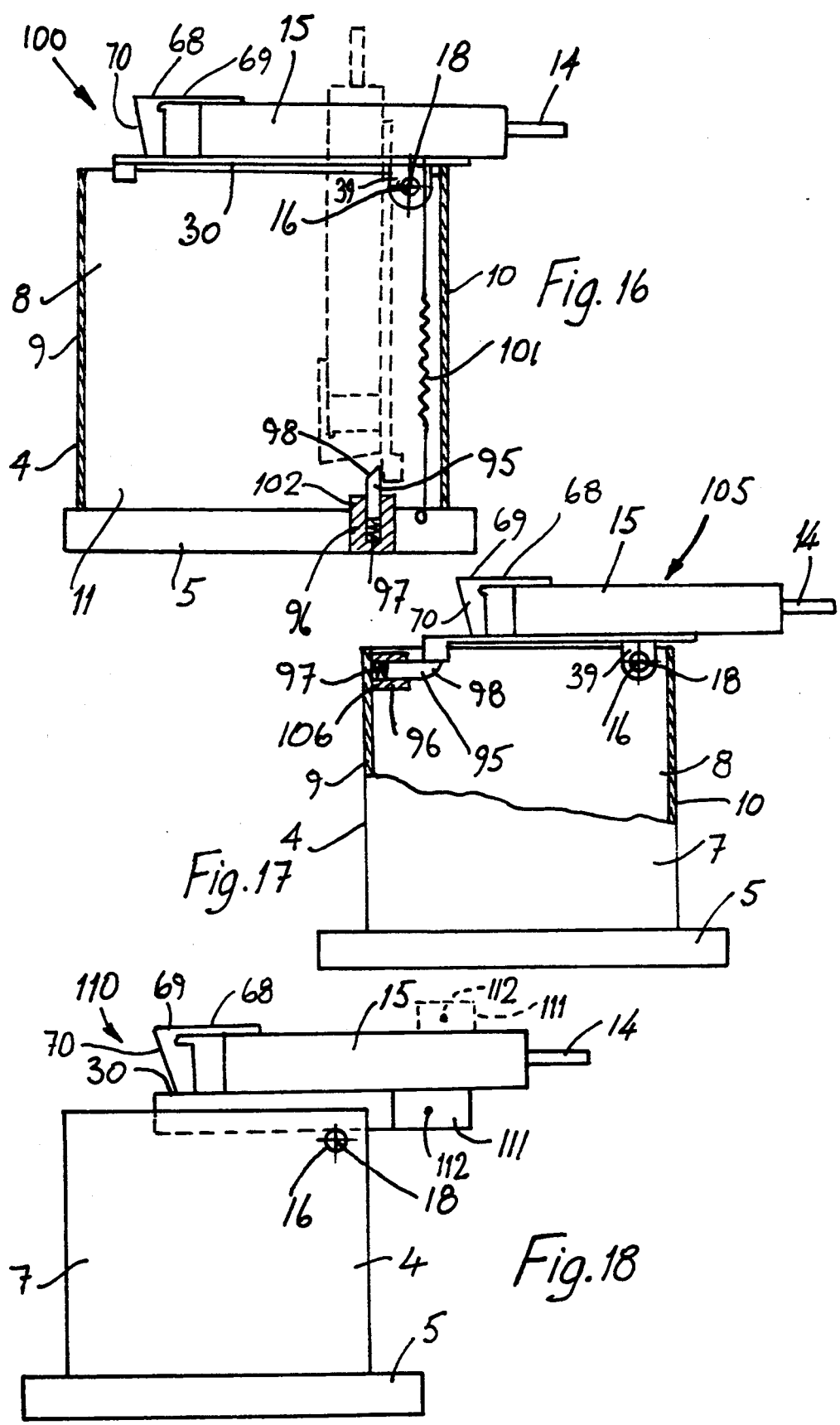

WHEEL BALANCER IN WHICH A SUB-HOUSING CARRYING A MAIN SHAFT IS PIVOTAL FROM A HORIZONTAL TO A VERTICAL POSITION FOR ALIGNING A WHEEL ON THE MAIN SHAFT

FIELD OF THE INVENTION

The present invention relates to a wheel balancer, and in particular, though not limited to a slow speed wheel balancer. The invention also relates to a method for rigidly coupling a wheel to be balanced in axial alignment with a main shaft of the wheel balancer.

BACKGROUND OF THE INVENTION

Wheel balancers, in general, comprise a housing which rotatably carries a substantially horizontal main shaft on which a wheel to be balanced is rigidly mounted by suitable coupling means. The main shaft is rotatable in bearings which, in general, are mounted or suspended from the housing so that transducers may be mounted between the bearings and the housing to enable out of balance moments in the main shaft to be detected. In practice, a wheel to be balanced is rigidly coupled to the main shaft and rotated at a speed sufficient that any imbalance in the wheel induces an out of balance moment in the main shaft sufficient to be detected by the transducers. Electronic signals from the transducers feed suitable electronic analyzing circuitry which computes the value and direction of the imbalance forces, and in turn, computes and displays the value of balance weights required and their relative positions on the wheel to correct the imbalance. In slow speed balancers, generally of the type which require rotation of the main shaft by hand, it is generally necessary to rotate the main shaft to a speed of at least 50 revs per minute, and usually, to a speed not exceeding 180 revs per minute. Typically, slow speed manual wheel balancers require rotation of the main shaft at approximately 70 to 150 revs per minute. In high speed balancers, generally of the type in which the main shaft is motor driven, the main shaft is typically rotated at a speed of the order of 300 revs per minute or greater.

To permit accurate computation of the imbalance of the wheel, it is essential that the wheel, when mounted on the main shaft, should be mounted and aligned co-axially with the main shaft. Otherwise, the results computed by the wheel balancer will be inaccurate. A wheel which is not co-axially aligned with the main shaft will yield an out of balance moment when rotated irrespective of whether the wheel is allegedly balanced or otherwise. The out of balance moment is further accentuated by the effects of gravity. In general, light weight wheels may readily easily be coupled manually on the main shaft of a wheel balancer by merely lifting the wheel onto the main shaft, and, by using a suitable coupler on the main shaft, the wheel can be co-axially aligned with the main shaft without any great difficulty. However, considerable difficulty is encountered where it is necessary to couple a relatively heavy or large size wheel onto the main shaft, such as, for example, a wheel of the type which would normally be used on a light weight truck such as, for example, a pick-up truck, van or other such vehicle. Needless to say, the heavier the wheel, the greater is the chance of the wheel being misaligned on the main shaft. The difficulty in centring the wheel on the main shaft to avoid misalignment arises from the fact that the wheel firstly, has to be lifted on to the main shaft, and then has to be lifted once more onto a coupling mechanism on the main shaft for coupling the wheel to the main shaft. In general, the coupling mechanism comprises a conical centring device, and the wheel has to be lifted onto the conical centring device for alignment with the main shaft. To do this, it is necessary to hold the wheel with one hand while a clamping device, generally, a nut on the main shaft is tightened with the other hand for securing the wheel to the coupling mechanism. It will be appreciated that where a relatively heavy wheel is to be coupled to the main shaft a considerable strain is applied to the back of the individual who is coupling the wheel to the main shaft.

Furthermore, due to the effects of gravity accurate centring of the wheel on the main shaft is difficult, and in some cases impossible, thereby leading to misalignment of the wheel with the main shaft.

In many cases to overcome these problems, mechanical lifting apparatus is used for lifting the wheel onto the main shaft, and for holding the wheel substantially aligned with the main shaft until the wheel has been securely coupled to the main shaft. Alternatively, two operators may be required, one to hold the wheel in position on the conical centring device while the other operator tightens the nut on the main shaft to secure the wheel to the coupling mechanism and in turn to the main shaft. This, it will be appreciated, is unsatisfactory, and furthermore, where such heavy wheels are not co-axially aligned with the main shaft, spurious results are obtained. This, needless to say, requires subsequent re-balancing of the wheel.

Furthermore, where an operator is fatigued when carrying out a wheel balancing operation, as a result of having balanced many wheels, or for other reasons, it has been found that even with relatively light weight wheels a fatigued operator may couple a relatively light weight wheel onto a main shaft of a wheel balancer with the axis of the wheel to be balanced, and the main shaft misaligned.

U.S. Pat. No. 3,922,922 discloses a wheel balancer which attempts to overcome these problems. Briefly, the wheel balancer of the U.S. specification comprises a cabinet within which a shaft support housing for rotatably carrying a main shaft is mounted. A wheel to be balanced is coupled to the main shaft. Suitable transducers co-operating with the main shaft and the shaft support housing enable imbalanced forces in the wheel to be detected on rotation of the wheel and main shaft. The shaft support housing is suspended by a bracket from a horizontal pivot axis, and a double acting hydraulic ram connected between the cabinet and the shaft support housing pivots the shaft support housing from a horizontal to a vertical position to facilitate coupling of the wheel. Unfortunately, this wheel balancer of U.S. Pat. No. 3,922,922 suffers from a number of serious disadvantages. It is particularly cumbersome and awkward to use, and is also relatively slow to use. It is also prone to mechanical failure, hydraulic leaks and the like. Because the shaft support housing is pivoted by a double acting hydraulic ram, operation of the balancer is considerably slowed down, which needless to say, leads to inefficiency of use. In order to couple a wheel to the main shaft according to the description in the U.S. specification, the shaft support housing should first be pivoted into the vertical position. The wheel must be lifted from the ground onto the main shaft and coupled thereto. This requires considerable operator effort, and is not feasible in the case of heavy or cumbersome wheels. Furthermore, in order to pivot the main support housing in the first instance from the horizontal to the vertical position, an operator must first operate appropriate hydraulic valves and operating levers for operating the hydraulic ram for pivoting the shaft support housing. This is a relatively slow, tedious and time-consuming operation, and thus reduces the efficiency of the wheel balancer. Even if one were to first lift the wheel to be balanced from the ground onto the main shaft with the shaft support housing in the horizontal position, the operation of appropriate hydraulic valves and operating levers by the operator would still be required in order to cause the hydraulic ram to pivot the shaft support housing from the horizontal to the vertical position. As discussed above, this is a relatively slow and tedious and inefficient operation. On the shaft support housing being in the vertical position, the wheel would be coupled to the main shaft. To balance a wheel, if the wheel is to be balanced with its rotational axis horizontal, it is then necessary to operate the operating levers controlling the hydraulic ram to operate the ram for pivoting the shaft support housing from the vertical to the horizontal position. Again, this is a relatively slow and tedious operation. A further disadvantage of the device of U.S. Pat. No. 3,922,922 is that the hydraulic ram needs some form of supplied energy, such as electricity powering, an electric motor, which powers an hydraulic pump to supply pressure to the hydraulic ram. This, needless to say, further adds to the cost and complexity of the device, and increases the likelihood of component failure, hydraulic oil leaks and the like resulting in consequential down time of the wheel balancer. Furthermore, because of the construction of the wheel balancer of U.S. Pat. No. 3,922,922, it would not be feasible to operate the balancer without the hydraulic ram since the hydraulic ram as well as being required for pivoting the shaft support housing, the hydraulic ram is also required for retaining the shaft support housing in the respective vertical and horizontal positions.

There is therefore a need for a wheel balancer and a method for rigidly coupling a wheel to be balanced in co-axial alignment with a main shaft of the wheel balancer which overcomes the problems of the wheel balancer of U.S. Pat. No. 3,922,922 as well as other prior art wheel balancers.

OBJECTS OF THE INVENTION

One object of the invention is to provide a wheel balancer which enables an individual to readily easily couple a wheel to be balanced in axial alignment with the main shaft of the wheel balancer, in other words, co-axially with the main shaft of the wheel balancer. Another object of the invention is to provide a wheel balancer which enables an individual with minimum effort to couple a wheel to be balanced in co-axial alignment with the main shaft of the wheel balancer. A particular object of the invention is to enable an individual to couple a wheel to be balanced in co-axial alignment with the main shaft of a wheel balancer without the need for the intervention or assistance of a third party or other apparatus, such as, for example, lifting apparatus and the like.

In particular, it is an object of the present invention to provide a wheel balancer in which a shaft support means supporting a main shaft of the wheel balancer can be readily easily oriented into a vertical position with the main shaft extending vertically upwardly of the shaft support means to facilitate co-axial coupling of the wheel to the main shaft, and it is an object of the invention that the shaft support means can be oriented into the vertical position by the operator without the need for a powered drive means, such as, for example, an hydraulic ram, a motor, or the like.

SUMMARY OF THE INVENTION

According to the invention there is provided a wheel balancer comprising a main support shaft, a shaft support means pivotally mounted on the main support, a main shaft rotatably carried by the shaft support means and rotatable about a rotational axis, a coupling means adjacent a free end of the main shaft for coupling a wheel to be balanced with the main shaft, with the rotational axis of the wheel co-axial with the rotational axis of the main shaft, the shaft support means being pivotally mounted on the main support about a horizontal main pivot axis extending transversely relative to the rotational axis of the main shaft, the shaft support means being pivotal about the main pivot axis from a horizontal position with the rotational axis of the main shaft substantially horizontal to a vertical position with the rotational axis of the main shaft substantially vertical and the free end of the main shaft extending upwardly of the shaft support means for coupling the wheel to the main shaft in co-axial alignment therewith, wherein the shaft support means and the main pivot axis are located to enable a wheel on the ground to be transferred by hand onto the main shaft when the shaft support means is in the horizontal position and to enable the shaft support means with the wheel on the main shaft to be pivoted by hand from the horizontal position to the vertical position, the transfer of the wheel onto the main shaft and the pivoting of the shaft support means being carried out sequentially by hand, and preferably, by one movement of the hand.

In one embodiment of the invention the main pivot axis is located at or below the rotational axis of the main shaft when the shaft support means is in the horizontal position.

In another embodiment of the invention the main pivot axis is located below the centre of gravity of the combined shaft support means and the main shaft when the shaft support means is in the horizontal position.

Advantageously, the main pivot axis is spaced apart from the coupling means.

Preferably, a hand engaging means is provided on the shaft support means to facilitate downward pressure being applied by hand to the shaft support means for assisting in pivoting of the shaft support means from the horizontal position, the hand engaging means being spaced apart from the main pivot axis on the opposite side thereof to the coupling means.

Advantageously, a retaining means is provided for retaining the shaft support means in the horizontal position.

In one embodiment of the invention a non-powered biasing means for urging the shaft support means into the horizontal position is provided. The phrase "non-powered biasing means" as used here and throughout this specification and the claims means a biasing means which provides a biasing force without the need for an external power source or supply. It is a biasing means which can provide a force by virtue of its own inherent characteristics. For example, by virtue of its position, such as, for example, a weight acting under gravity, or, for example, by virtue of its inherent resilience and/or elasticity, for example, such as a compression spring, tension spring, gas spring or the like. Needless to say, these examples of non-powered biasing means are not intended as limiting the meaning of the phrase, but rather are given to assist in an understanding of the phrase, and accordingly, the phrase is intended to be interpreted to embrace all possible non-powered biasing means.

Preferably, the non-powered biasing means is connected between the shaft support means and the main support, the non-powered biasing means providing a turning moment which acts about the main pivot axis to urge the shaft support means into the horizontal position as the shaft support means is approaching the horizontal position.

Advantageously, the non-powered biasing means provides a turning moment which acts about the main pivot axis for urging the shaft support means into the vertical position as the shaft support means is approaching the vertical position.

In a further embodiment of the invention the turning moment acting on the shaft support means provided by the non-powered biasing means is substantially zero when the shaft support means is in a neutral position, intermediate the horizontal position and the vertical position, and the direction of the turning moment reverses as the shaft support means passes through the neutral position.

Preferably, the non-powered biasing means is an elastic biasing means.

Advantageously, the non-powered biasing means comprises a gas spring.

In one embodiment of the invention the non-powered biasing means forms the retaining means.

In one embodiment of the invention first and second locating means are provided for locating the shaft support means in the respective horizontal and vertical positions.

In a further embodiment of the invention a damping means is provided for damping movement of the shaft support means as it moves into the vertical and horizontal positions.

Advantageously, the transfer of the wheel onto the main shaft and the pivoting of the shaft support means from the horizontal position to the vertical position is carried out by a substantially continuous movement of the hand.

Additionally, the invention provides a method for rigidly coupling a wheel to be balanced in co-axial alignment with the main shaft of the wheel balancer according to the invention, the method comprising the steps of transferring the wheel by hand from the ground onto the main shaft when the shaft support means is in the horizontal position, and pivoting by hand the shaft support means with the wheel on the main shaft from the horizontal position to the vertical position, the transfer of the wheel onto the main shaft and the pivoting of the shaft support means being carried out sequentially by hand, and securing the wheel on the main shaft by a coupling means while the shaft support means is in the vertical position.

In one embodiment of the invention the wheel is transferred from the ground onto the main shaft and the shaft support means is pivoted from the horizontal position into the vertical position by substantially one movement of the hand, and preferably, by one continuous movement of the hand.

Preferably, the method further comprises the step of placing another hand on the hand engaging means of the shaft support means and applying a downward pressure to the hand engaging means for assisting pivoting of the shaft support means from the horizontal position.

In a further embodiment of the invention the method further comprises the step of pivoting the shaft support means by hand with the wheel coupled to the main shaft from the vertical position to the horizontal position for balancing of the wheel.

ADVANTAGES OF THE INVENTION

The advantages of the invention are many. By virtue of the fact that the main shaft is pivotal from a horizontal position for balancing to a vertical position for coupling of the wheel thereto accurate alignment of the wheel with the main shaft is achieved so that the wheel and the main shaft are co-axial with each other. This thus permits accurate balancing of the wheel on the wheel balancer. By virtue of the fact that the wheel can be coupled to the main shaft with the axes of both the wheel and the main shaft vertically disposed, gravity instead of urging the wheel into misalignment with the main shaft will either have a neutral effect, or as in most cases depending on the coupling mechanism on the main shaft will actually assist in urging the wheel into co-axial alignment with the main shaft.

A particularly important advantage of the invention is that by virtue of the fact that the main shaft and the main pivot axis are located so that the wheel can be transferred from the ground to the main shaft, and then that the support means and the main shaft with the wheel thereon can be pivoted from the horizontal to the vertical position by hand enables a wheel to be placed on the main shaft and co-axially aligned therewith with minimum effort by a single individual, and in particular, without the intervention of any external power assistance. Furthermore, this feature enables a wheel to be transferred onto the main shaft and coupled thereto rapidly and without any delay. A further and particularly important advantage of the invention is that an operator can readily easily transfer and couple a relatively and/or cumbersome wheel to the main shaft rapidly and with little effort, and without the need for external power assistance. Where the shaft support means and the main pivot axis are located to enable the wheel to be transferred onto the main shaft and the shaft support means to be pivoted from the horizontal to the vertical position by one movement of the hand a particularly efficient form of wheel balancer is provided. The fact that the main pivot axis is located at or below the rotational axis of the main shaft when the shaft support means is in the horizontal position, in particular permits the shaft support means with the wheel on the main shaft to be pivoted from the horizontal position to the vertical position with relatively little effort, and enables the shaft support means and wheel to be pivoted from the horizontal position to the vertical position sequentially after the wheel has been transferred onto the main shaft in substantially one continuous movement of the hand. The provision of the main pivot axis below the centre of gravity of the combined shaft support means and the main shaft when the shaft support means is in the horizontal position further facilitates this advantage. By virtue of the fact that when in the horizontal position the main pivot axis is below the centre of gravity of the combination of the shaft support means and the main shaft, when the shaft support means is pivoted into the vertical position, and indeed, when the shaft support means is approaching the vertical position, the combined weight of the shaft support means and the main shaft acting through the centre of gravity of the combination induces a turning moment in the shaft support means which acts to urge the shaft support means into the vertical position, and also acts to retain the shaft support means in the vertical position. In fact, the combined weight of the shaft support means and the main shaft acting through the centre of gravity of the combination when the shaft support means is in the vertical position forms a biasing means or biasing force for urging and retaining the shaft support means into the vertical position. Where the main pivot axis is below the rotational axis of the main shaft, the weight of the wheel on the main shaft acts through the rotational axis of the main shaft when the shaft support means is in the vertical position, and thus, the additional weight of the wheel further acts to urge and retain the shaft support means in the vertical position. Indeed, where the main pivot axis is at, in other words is in the same plane as the rotational axis of the main shaft, the weight of the wheel on the main shaft which acts through the rotational axis of the main shaft when the shaft support means is in the vertical position has a neutral effect on the shaft support means, since the weight of the wheel effectively acts through the main pivot axis of the shaft support means in the vertical direction, thereby providing a zero turning moment when the shaft support means is in the vertical position, and accordingly, the turning moment induced by the weight of the shaft support means retains the shaft support means in the vertical position.

A further advantage of the invention is achieved when the centre of gravity of the combination of the shaft support means and the main shaft be to one side of the main pivot axis when the shaft support means is in the horizontal position, and is disposed between the main pivot axis and the coupling means. In this way that the combined weight of the shaft support means and the main shaft acting through the centre of gravity acts to induce a turning moment for urging the shaft support means into the horizontal position as the shaft support means is approaching the horizontal position. Furthermore the shaft support means is retained in the horizontal position by the combined weight of the shaft support means and the main shaft. Indeed, the weight of the wheel on the main shaft when the shaft support means is approaching the horizontal position further assists in urging the shaft support means into the horizontal position.

Accordingly, the invention provides a particularly efficient wheel balancer, and a wheel balancer which is convenient to use and operate. Where the main shaft and shaft support means are arranged for enabling the wheel to be transferred from the ground to the main shaft and the main support means to be pivoted from the horizontal to the vertical position in one continuous movement of the hand, a particularly efficient and convenient to operate wheel balancer is provided, since there are no delays between lifting the wheel onto the main shaft and pivoting the shaft support means and the main shaft with the wheel thereon from the horizontal to the vertical position.

The provision of non-powered biasing means for providing a turning moment about the main pivot axis for urging the shaft support means into the horizontal position provides a particularly advantageous and efficient form of the wheel balancer. The non-powered biasing means assists in pivoting the shaft support means into the horizontal position. Where the nonpowered biasing means provides a turning moment about the main pivot axis for urging the shaft support means into both the vertical and horizontal positions as the shaft support means is approaching the respective vertical and horizontal positions, a particularly efficient form of wheel balancer is provided.

The arrangement of the non-powered biasing means so that the direction of the turning moment exerted by the biasing means reverses as the shaft support means passes through its midway position, which is midway between the horizontal and vertical positions further improves operating efficiency of the wheel balancer. In particular, once the shaft support means passes through the midway position in its travel, the non-powered biasing means commences to assist pivoting of the shaft support means and the main shaft with the wheel mounted thereon towards the respective horizontal and vertical positions as the case may be. The fact that the biasing means provides a turning moment which acts to urge the shaft support means into the respective horizontal and vertical positions as the shaft support means is approaching the respective horizontal and vertical positions, enables the biasing means to be used as a retaining means for retaining the shaft support means in the respective horizontal and vertical positions.

The provision of the non-powered biasing means in the form of a gas spring, provides a relatively efficient and relatively low cost example of the wheel balancer.

Where the non-powered biasing means forms the retaining means for retaining the shaft support means and the main shaft in the horizontal position, a particularly efficient construction of wheel balancer is provided, and where the non-powered biasing means acts as a retaining means for retaining the shaft support means and the main shaft in both the vertical and horizontal position an even more efficient construction of wheel balancer is provided.

Provision of the hand engaging means on the shaft support means provides a further advantage to the wheel balancer in that while one hand is holding the wheel on the main shaft, and continuing to pivot the shaft support means through the wheel, the other hand of the individual may be placed on the hand engaging means for pivoting the shaft support means and the main shaft with the wheel thereon from the horizontal position. This enables the operator to provide an additional initial force by hand to the shaft support means to commence the pivoting action of the shaft support means, and thereby further increases the efficiency of use of the wheel balancer, and in particular, adds to the ease and speed with which the wheel is coupled to the main shaft of the wheel balancer.

By providing first and second locating means for locating the shaft support means in the respective horizontal and vertical positions, a particularly efficient construction of wheel balancer is provided. In particular, the provision of the first and second locating means can co-operate with the non-powered biasing means for retaining the shaft support means in the respective horizontal and vertical positions. Alternatively, the first and second locating means may co-operate with the retaining means for retaining the shaft support means in the respective horizontal and vertical positions.

The provision of damping means for damping the movement of the shaft support means as it moves into the vertical and horizontal positions prevents any danger of the shaft support means being brought to a sudden halt as it is moving into the vertical or horizontal positions as the case may be, thereby avoiding shocks to the wheel balancer.

A particularly important advantage of the invention is that by virtue of the fact that no external power source is required for pivoting the shaft support means from the horizontal position to the vertical position and vice versa, a relatively low cost, and simple to operate and maintain wheel balancer is provided, and additionally, the running and maintenance cost of the wheel balancer are relatively low.

The method according to the invention has many advantages, and the main advantage of the method is that a wheel can readily easily be coupled to the main shaft in co-axial alignment therewith with minimum effort, irrespective of the weight of the wheel. Other advantages of use of the method according to the invention are substantially similar to the advantages achieved from the wheel balancer.

These and other objects and advantages of the invention will be readily apparent to those skilled in the art from the following description of some preferred embodiments thereof which are given by way of example only, with reference to the accompanying drawings, and which are not intended to limit the scope of the invention, in which:

BRIEF DESCRIPTION OF THE DRAWINGS

FIG. 5 is a cross-sectional front elevational view of portion of the wheel balancer of FIG. 1, FIG. 6 is a cross-sectional end elevational view of the portion of the wheel balancer of FIG. 5 on the line VI—VI of FIG. 5, FIG. 11 is a diagrammatic sectional front elevational view of a wheel balancer according to another embodiment of the invention, FIG. 12 is a front elevational view of a detail of the wheel balancer of FIG. 11, FIG. 13 is a front elevational view of a detail of a wheel balancer according to another embodiment of the invention, FIG. 14 is a diagrammatic front elevational view of portion of a wheel balancer according to a further embodiment of the invention, FIG. 15 is a diagrammatic partly sectional front elevational view of a wheel balancer according to a further embodiment of the invention, FIG. 16 is a diagrammatic sectional front elevational view of a wheel balancer according to a still further embodiment of the invention, FIG. 17 is a diagrammatic partly sectional front elevational view of a wheel balancer according to a still further embodiment of the invention, and FIG. 18 is a diagrammatic front elevational view of a wheel balancer according to a still further embodiment of the invention.

DETAILED DESCRIPTION OF THE INVENTION

Figure 1:
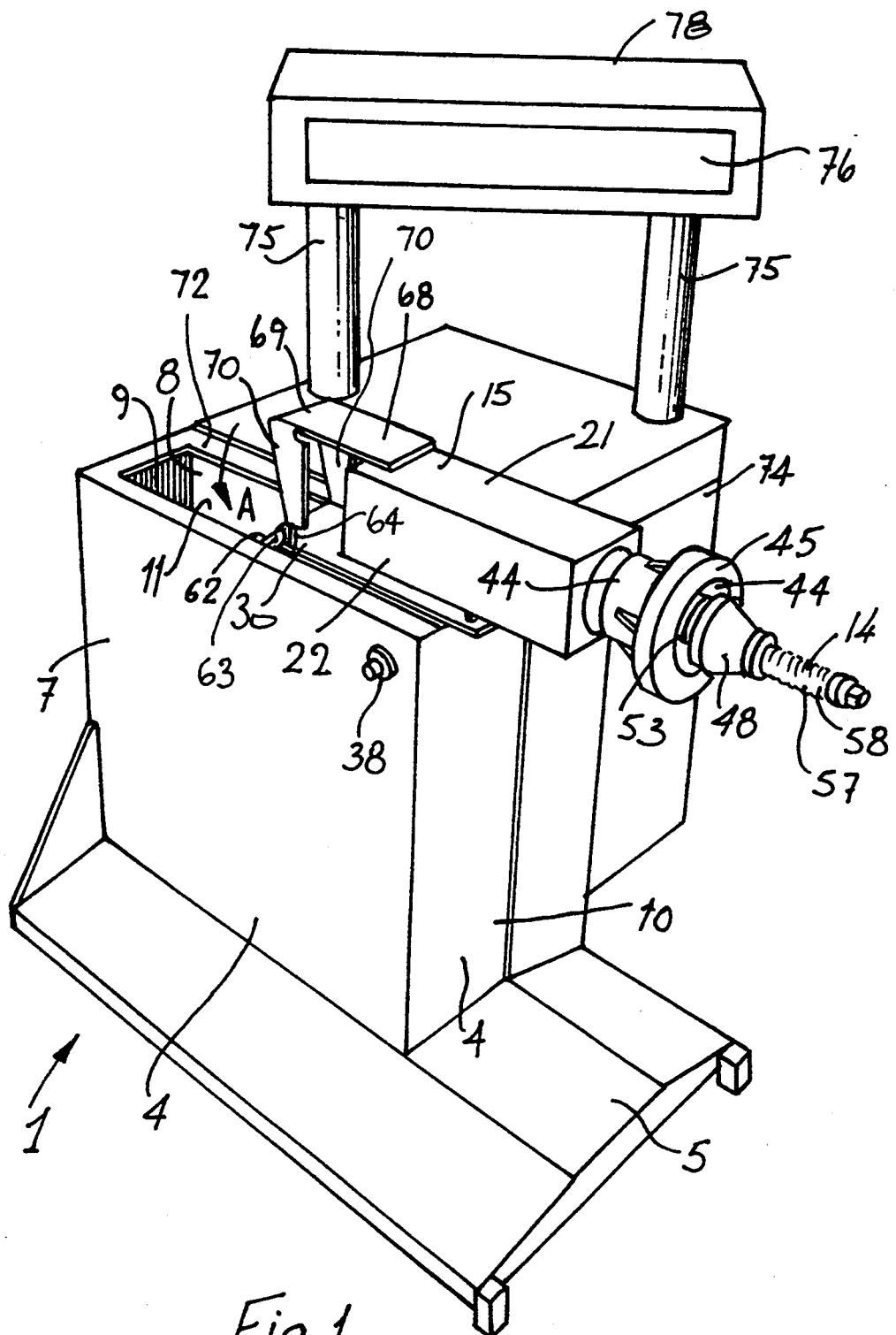
FIG. 1 is a perspective view of a wheel balancer according to the invent ion.
Figure 2:
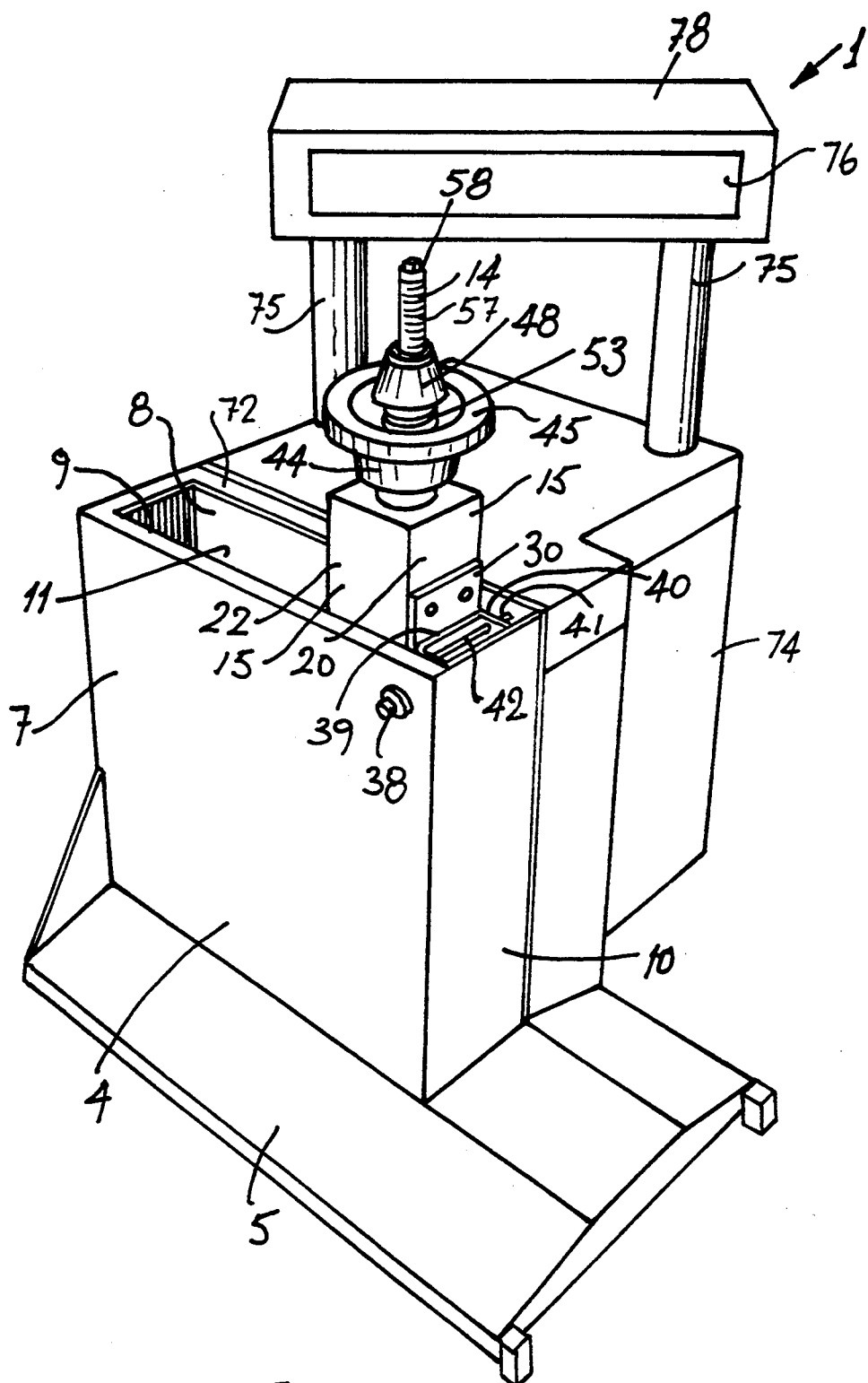
FIG. 2 is a perspective view of the wheel balancer of FIG. 1 with portion of the wheel balancer in a different position.
Figure 3:
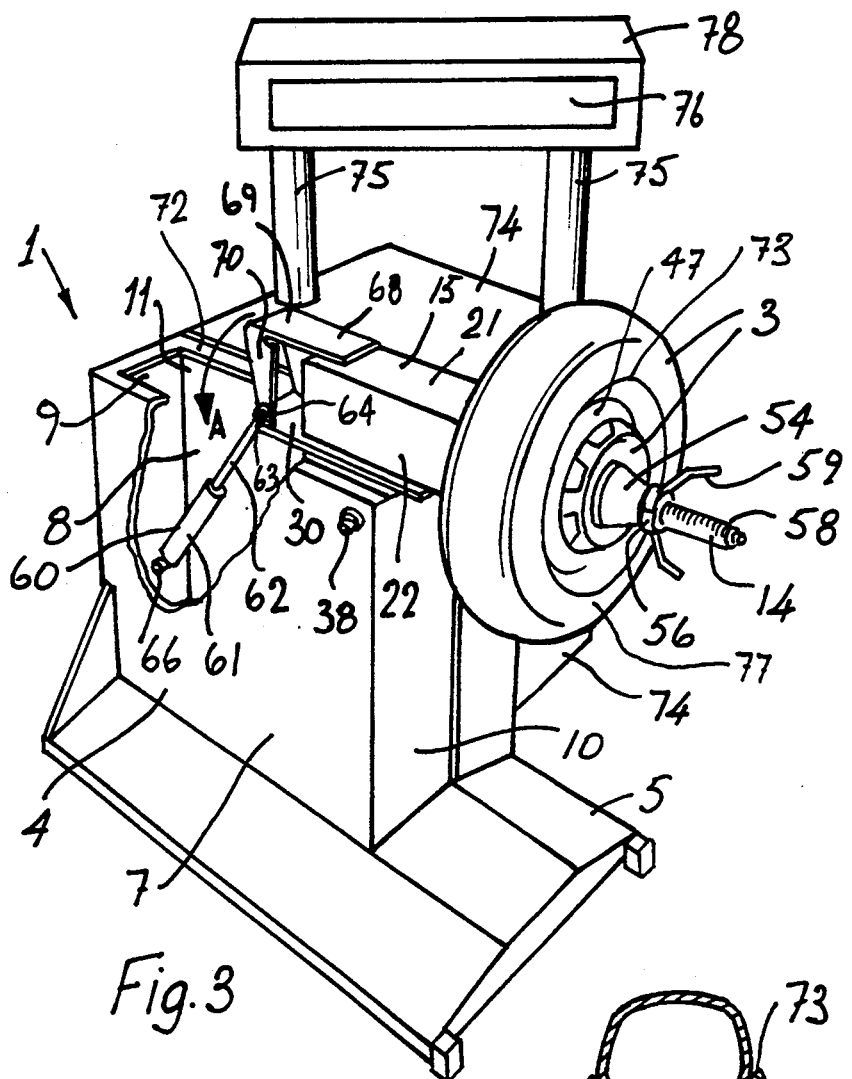
FIG. 3 is a perspective view of the wheel balancer of FIG. 1 illustrating the wheel balancer in use.
Figure 7:
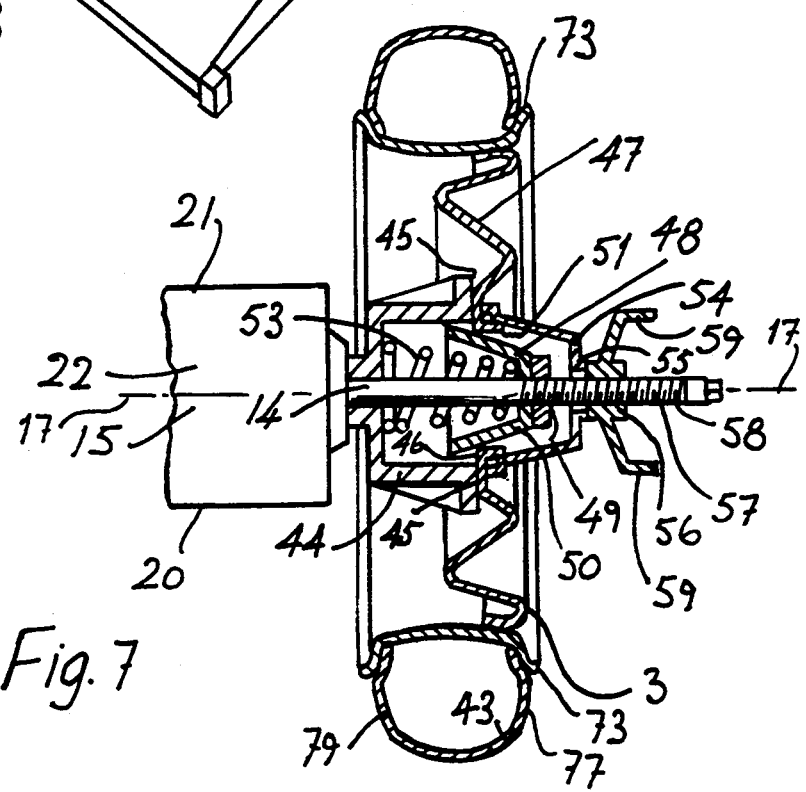
FIG. 7 is a cross-sectional front elevational view of another portion of the wheel balancer of FIG. 1.
Figure 4:
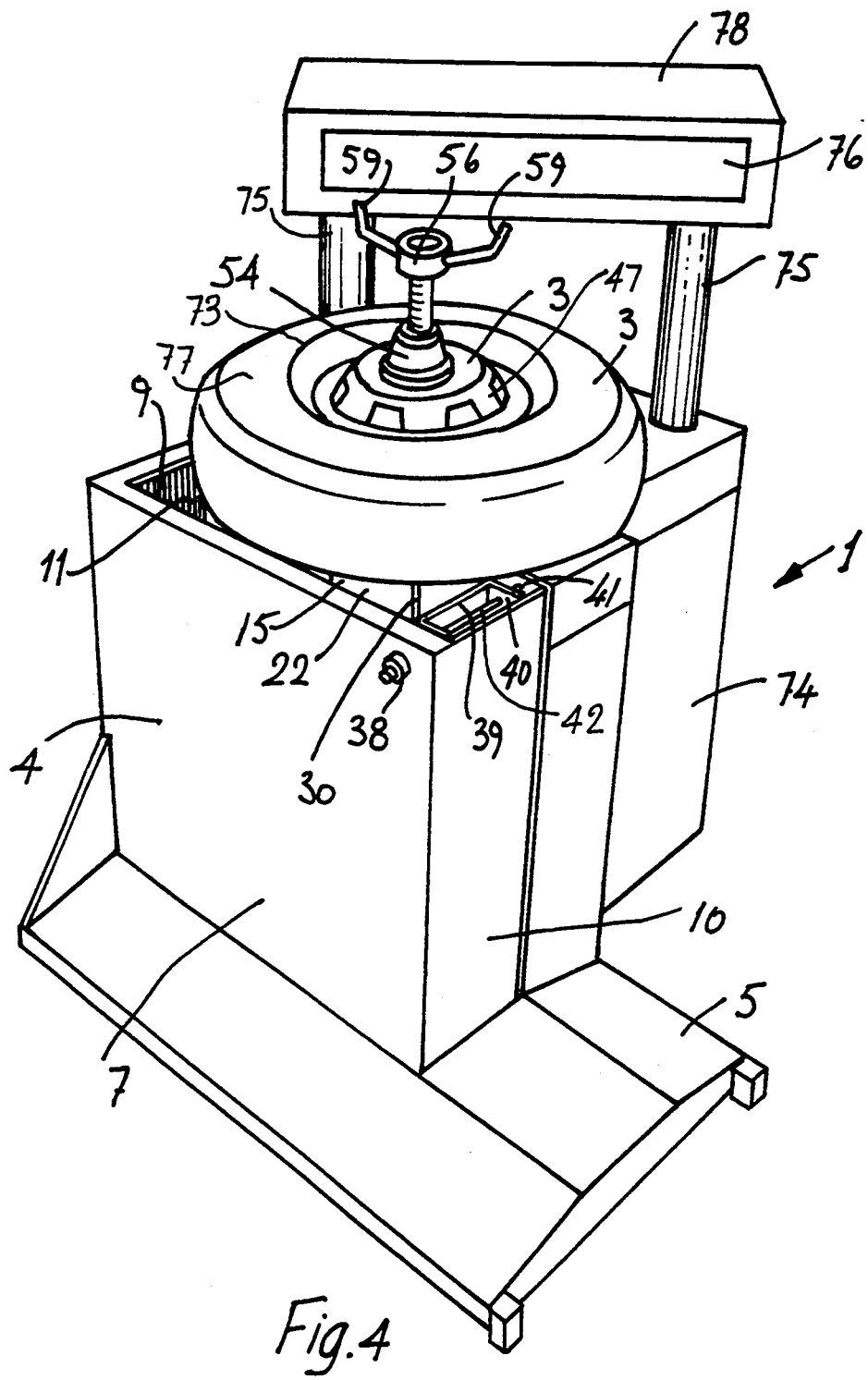
FIG. 4 is a perspective view of the wheel balancer of FIG. 1 also illustrating the wheel balancer in use in a different position to FIG. 3.

Referring to the drawings and initially to FIGS. 1 to 10 thereof, there is illustrated a wheel balancer according to the invention indicated generally by the reference numeral i for balancing a wheel 3. The balancer i comprises a main support, in this case, provided by a main housing 4 extending upwardly from a ground engaging base 5 of steel plate material. The main housing 4 comprises front and rear side walls 7 and 8, respectively, joined by end walls 9 and 10, all of steel plate material and extending upwardly from the base 5. The base 5, front and rear side walls 7 and 8 and end walls 9 and 10 define a hollow interior region 11. A main shaft 14 to which the wheel 3 to be balanced is coupled is rotatably carried in a shaft support means comprising a sub-housing 15 which is pivotally connected by a pivot shaft 16 to the main housing 4. The main shaft 14 is rotatable about its geometric axis 17, see FIG. 5. The pivot shaft 16 defines a horizontal main pivot axis 18 about which the sub-housing 15 is pivotal from a horizontal position illustrated in FIG. 1 to a vertical position illustrated in FIG. 2. When the sub-housing 15 is in the horizontal position, the main shaft 14 is horizontal and is in position for balancing the wheel 3. When the sub-housing 15 is in the vertical position, the main shaft 14 extends vertically upwardly to facilitate coupling of the wheel 3 co-axially on the main shaft 14, as will be described below. The main pivot axis 18 is located below the rotational axis 17 of the main shaft 14 when the sub-housing 15 is in the horizontal position, and extends transversely of the rotational axis 17 to permit pivoting of the sub-housing 15 from the horizontal position to the vertical position. As can be seen in the drawings, the main pivot axis 18 is also located below the sub-housing 15 and the main shaft 14 when the sub-housing 15 is in the horizontal position. Accordingly, the main pivot axis 18 is located below the centre of gravity of the combination of the sub-housing 15 and the main shaft 14 when the sub-housing 15 is in the horizontal position.

The sub-housing 15 comprises a base 20 and a top wall 21 joined by side walls 22 all of steel plate material which define a hollow interior region 23, see FIGS. 5 and 6. The main shaft 14 is rotatably carried in a cylindrical sleeve 25 of steel on a pair of spaced apart bearings 26 mounted at respective ends of the sleeve 25. The sleeve 25 is mounted in the hollow interior region 23 on a pair of spaced apart mounting members 27 of spring steel secured by screws 28 to mounting blocks 29 which are welded to the top wall 21 of the sub-housing 15. Screws 31 secure the mounting members 27 to the sleeve 25. Two transducers 33 are mounted between respective pairs of blocks 34 and 35 which are disposed between the mounting members 27 adjacent the sleeve 25 and a side wall 22 of the sub-housing 15 for determining strain in the blocks 34 and 35 for, in turn, determining out of balance forces in the main shaft 14 which are induced by an imbalance in the wheel 3. The screws 31 secure one block 34 of each pair of blocks to the corresponding mounting member 27 and to the sleeve 25, while screws 32 secure the other blocks 35 to the side wall 22. This aspect of wheel balancers will be well known to those skilled in the art. A typical wheel balancer is described in British Pat. Specification No. 2,131,561. A support bar 36 extends from the top wall 21 and is connected by a mounting bracket 37 to the sleeve 25 for supporting the sleeve 25 in the hollow interior region 23. The mounting bracket 37 is centrally located along the sleeve 25.

The sub-housing 15 is mounted on a base plate 30 which is welded to the base 20. The pivot shaft 16 extends between and through the front and rear side walls 7 and 8, respectively, of the main housing 4 and is located by, and rotatable in bearings 38 mounted on the front and rear side walls 7 and 8, respectively. An inverted U-shaped bracket 39 of aluminium welded to the base plate 30 of the sub-housing 15 is carried on the pivot shaft 16. Side webs 40 of the bracket 39 engage the pivot shaft 16. Spacers 41 and 42 locate the bracket 39, and in turn, the sub-housing 15 centrally on the pivot shaft 16 to facilitate pivoting of the sub-housing 15 into the interior region 11 of the main housing 4 as the sub-housing 15 is being pivoted into the vertical position.

Coupling means for coupling the wheel 3 to be balanced onto the main shaft 14 with the rotational axis of the wheel co-axially aligned with the axis 17 of the main shaft 14 comprises a coupler 44 of cast aluminium rigidly mounted to the main shaft 14. The coupler 44 defines a radial face 45 which extends circumferentially around the main shaft 14 for receiving a corresponding inner face 46 of a hub 47 of the wheel 3, see FIG. 7. The hub 47 carries a tire 43. The coupling means also comprises an alignment means, namely, a partly conical cone member 48 of cast steel having a bore 49 extending therethrough for slidably engaging the main shaft 14. The cone member 48 comprises an outer partly conical surface 50 for engaging a corresponding central opening 51 in the wheel 3 to be balanced for facilitating axial alignment with the main shaft 14. A compression spring 53 acting between the coupler 44 and the cone member 48 urges the cone member 48 into the central opening 51 in the wheel 3 for facilitating co-axial alignment of the wheel 3 with the main shaft 14. A clamping member 54 of injection moulded plastics material having a bore 55 extending therethrough slidably engages the main shaft 14, and a nut 56 co-operable with threads 57 on a free end 58 of the main shaft 14 tightens the clamping member 54 onto the wheel 3 for clamping the wheel 3 between the clamping member 54 and the radial face 45 of the coupler 44. Finger grips 59 extending from the nut 56 facilitate tightening of the nut 56 on the free end 58 of the main shaft 14. Such construction of coupling means for coupling a wheel onto a main shaft of a wheel balancer will be well known to those skilled in the art. The coupler 44 is located on the main shaft 14 radially spaced apart from the main pivot axis 18. The main shaft 14 extends outwardly of the coupler 44 for receiving a wheel 3 to be balanced. The sub-housing 15, the main shaft 14 and the pivot shaft 16 are located relative to each other so that a wheel 3 on the ground can be transferred by hand onto the main shaft 14 when the sub-housing 15 is in the horizontal position, and the sub-housing 15 with the wheel 3 on the main shaft 14 can be pivoted by hand from the horizontal position to the vertical position. The transfer of the wheel 3 onto the main shaft 14 and the pivoting of the sub-housing 15 from the horizontal to the vertical position can be carried out sequentially in substantially one movement of the hand.

Figure 8:
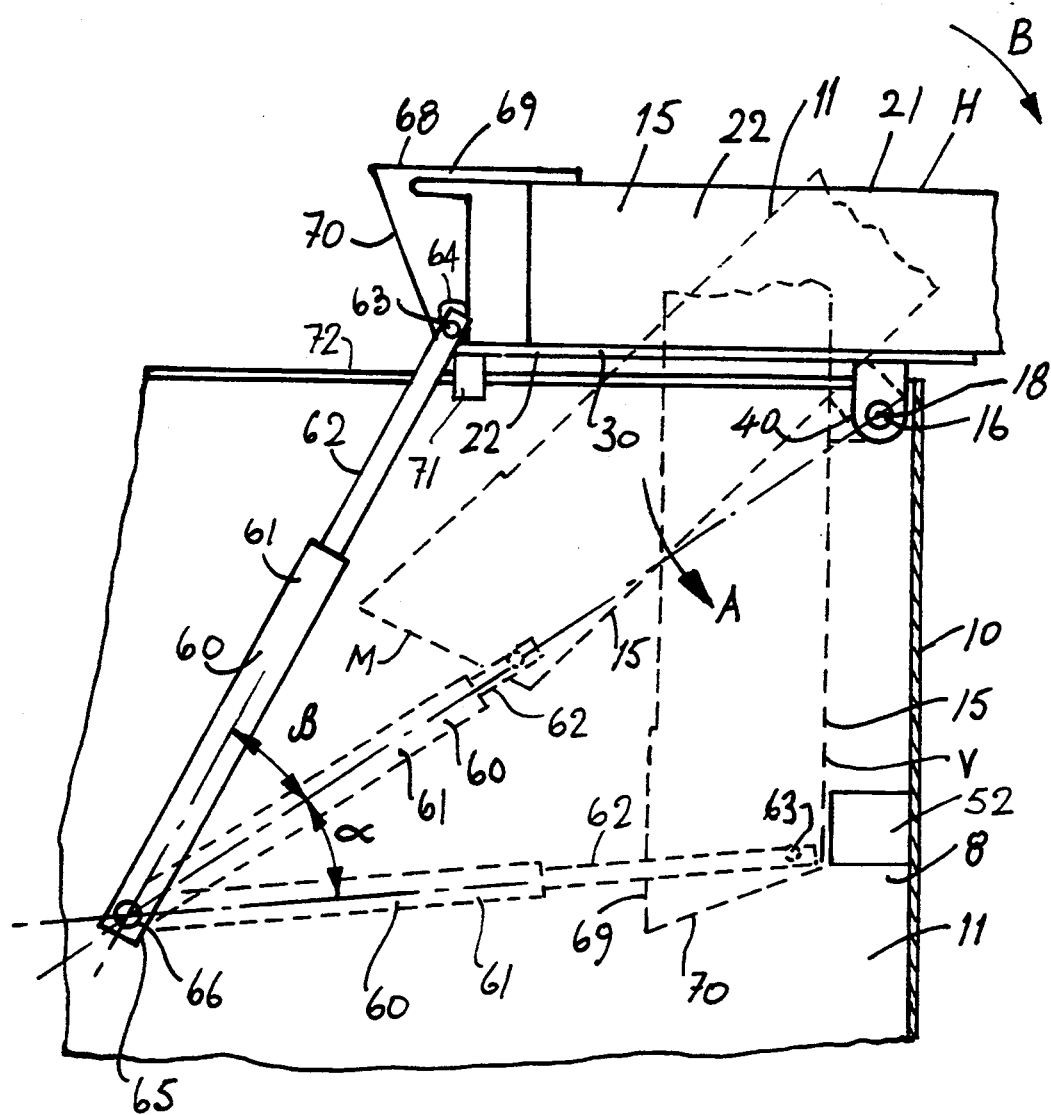
FIG. 8 is a cross-sectional front elevational view of another portion of the wheel balancer of FIG. 1.

First locating means for locating the sub-housing 15 in the horizontal position comprises a locating lug 71 extending from the base plate 30 for engaging an inwardly directed rim 72 extending from the rear side wall 8 when the sub-housing 15 pivots into the horizontal position, see FIGS. 6 and 8. Second locating means for locating the sub-housing 15 in the vertical position comprises an abutment block 52 mounted in the interior region 11 on the end wall 10 of the main housing 4 for abutting the base plate 30 when the sub-housing 15 pivots into the vertical position, see FIG. 8.

Retaining means for retaining the sub-housing 15 in the horizontal position and also in the vertical position, in this case, comprises a non-powered biasing means which also urges the sub-housing 15 into the vertical and horizontal positions after the sub-housing 15 has passed through a midway position halfway between the vertical and horizontal positions. The non-powered biasing means comprises an elastic biasing means, namely a gas spring 60 which as well as urging the sub-housing 15 into the horizontal and vertical positions, also in this embodiment of the invention co-operates with the abutment block 52 and the locating lug 71 for retaining and locating the sub-housing 15 in the vertical and horizontal positions, respectively. The gas spring 60 comprises a cylinder 61 and a piston rod 62 slidably extending from the cylinder 61 from a piston (not shown) slidable in the cylinder 61. The piston rod 62 is urged axially outwardly of the cylinder 61 by pressure of gas in the cylinder 61, thereby providing a biasing force acting axially along the piston rod 62 for urging the sub-housing 15 into the horizontal and vertical positions. The piston rod 62 is pivotally connected to the base plate 30 of the sub-housing 15 by a pivot pin 63 carried on a bracket 64 mounted on the base plate 30. The pivot pin 63 is located at a position radially spaced apart from the main pivot axis 18. The cylinder 61 of the gas spring 60 is pivotally connected to the main housing 4 by a pivot pin 66 secured to the front side wall 7 of the main housing 4 at a position radially spaced apart from the main pivot axis 18 of the pivot shaft 16. The gas spring 60 is connected to the main housing 4 and the sub-housing 15 so that as the sub-housing 15 is in the midway position halfway between the horizontal and vertical positions, the line of action of the biasing force of the gas spring 60 acts through the pivot axis 18 of the pivot shaft 16. The midway position of the sub-housing 15 is illustrated in FIG. 8 in broken lines and indicated by the reference letter M. The horizontal and vertical positions of the sub-housing 15 are respectively illustrated in FIG. 8 in full and broken lines, respectively, and indicated by the reference letters H and V, respectively. As the sub-housing 15 pivots from the midway position towards the vertical or horizontal positions, the biasing force of the gas spring 60 provides a turning moment which acts on the sub-housing 15 about the main pivot axis 18 for urging the sub-housing 15 into the horizontal or vertical position as the case may be. The gas spring 60 pivots through an angle $\alpha$ as the sub-housing 15 pivots from the midway position to the vertical position, and through an angle $\beta$, which in this case is equal to $\alpha$, as the sub-housing 15 pivots from the midway position to the horizontal position. Accordingly, as the sub-housing 15 moves from the midway position, the line of action of the biasing force of the gas spring 60 moves away from the main pivot axis 18, thereby inducing the appropriate turning moment for urging the sub-housing 15 into the respective horizontal and vertical positions. In the midway position, the turning moment provided by the gas spring 60 on the sub-housing 15 about the main pivot axis 18 is zero, and furthermore, the direction of the turning moment provided by the biasing force of the gas spring 60 reverses as the sub-housing 15 pivots through the midway position. In this way, the gas spring 60 acts as an aid for pivoting the sub-housing 15 from the midway position to the respective horizontal and vertical positions. Additionally, by virtue of the fact that the gas spring 60 induces a turning moment in the sub-housing 15 about the main pivot axis 18, the gas spring 60 co-operates with the abutment block 52 and the locating lug 71 for locating and retaining the sub-housing 15 in the respective vertical and horizontal positions.

Damping means comprising a damping mechanism (not shown) in the gas spring 60 acts on the piston (not shown) and in turn on the piston rod 62 as the piston rod 62 is approaching its fully extended position for damping the last few degrees of movement of the sub-housing 15 into the vertical and horizontal positions.

Figure 9:
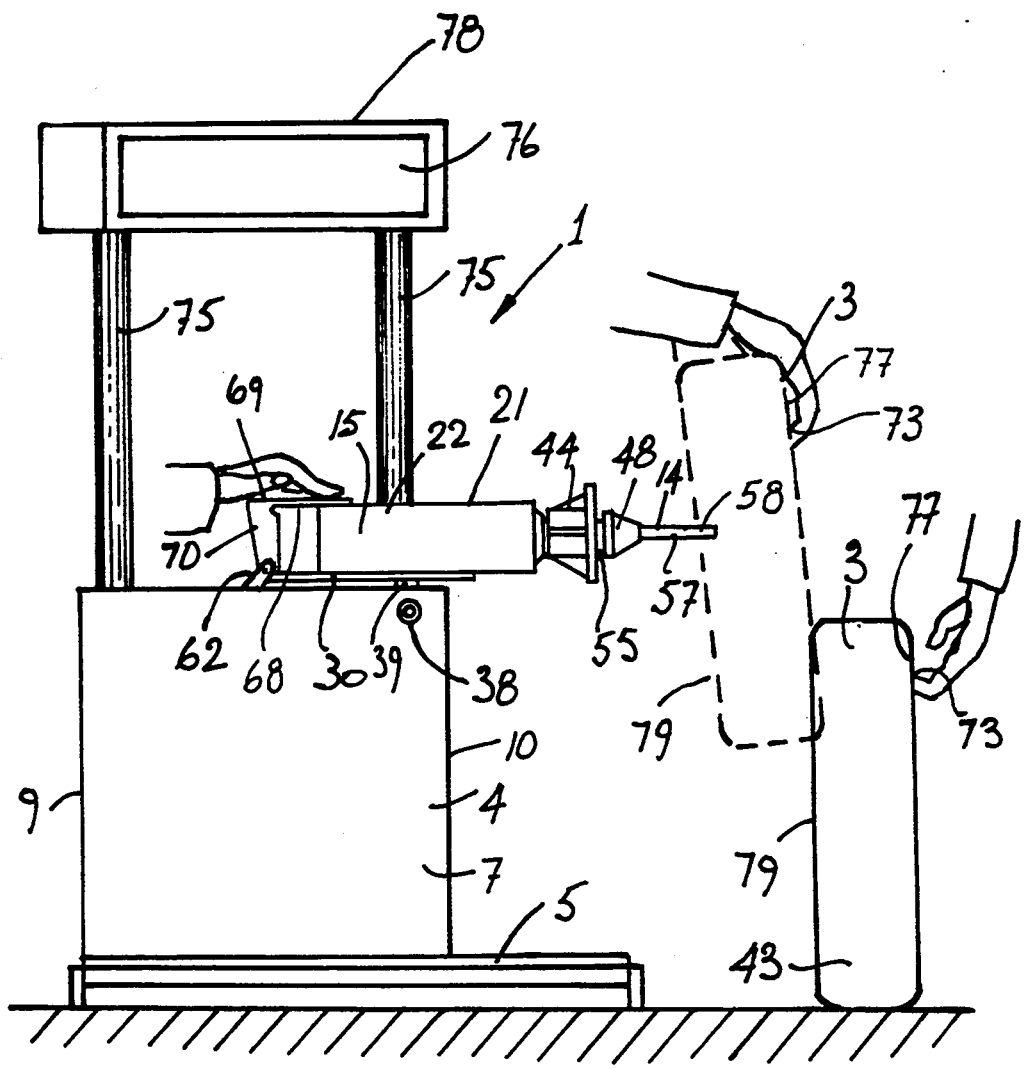
FIG. 9 is a front elevational view of the wheel balancer of FIG. 1 in use.
Figure 10:
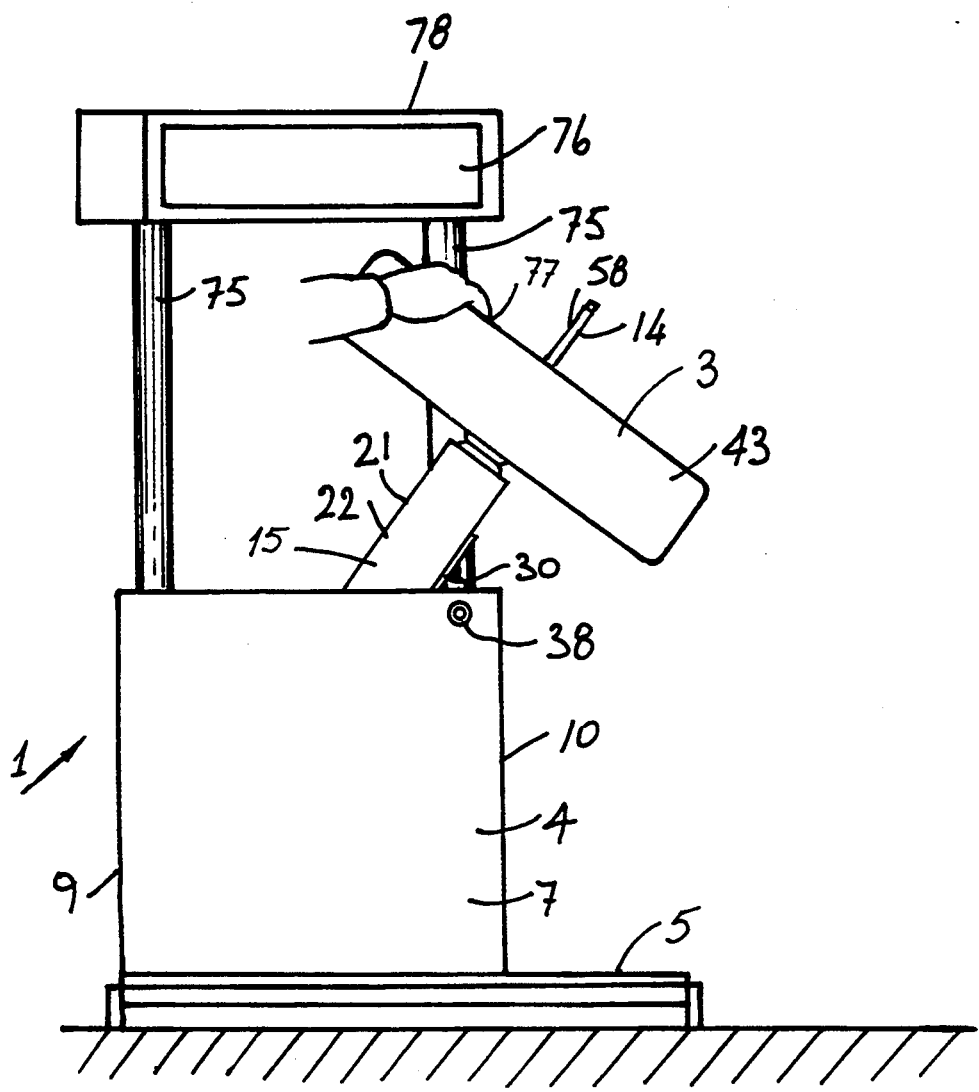
FIG. 10 is a view similar to FIG. 9 of the wheel balancer also in use.

A hand engaging means, namely, a hand plate 68 extending from the top wall 21 of the sub-housing 15 forms a hand engaging area 69 to enable a user to place a hand thereon for applying downward pressure for initially assisting in pivoting the sub-housing 15 from the horizontal to the vertical position in the direction of the arrow A, see FIGS. 8 and 9. Support brackets 70 extend between the hand plate 68 and the base plate 30 of the sub-housing 15 for supporting the hand plate 68. In this embodiment of the invention the hand plate 68 is located on the sub-housing 15 so that the main pivot axis 18 of the pivot shaft 16 is substantially midway between the hand plate 68 and the coupler 44. In other words, the hand plate 68 is radially spaced apart from the main pivot axis on the opposite side to that of the coupler 44. This facilitates pivoting of the sub-housing 15 from the horizontal position, and in particular facilitates pivoting of the sub-housing 15 from the horizontal position when a relatively heavy wheel is placed on the free end 58 of the main shaft 14, as will be described below.

A cabinet 74 extends rearwardly of the main housing 4 for accommodating electronic circuitry (not shown) for analyzing signals received from the transducers 33. The electronic circuitry (not shown) also computes the value of balance weights required on the inner and outer rims of the wheel 3 and their relative angular position. Such electronic circuitry will be well known to those skilled in the art. Cables (not shown) connect the transducers 33 to the electronic circuitry (not shown). A pair of support members 75 extending upwardly from the cabinet 74 carries a display housing 78. A display panel 76 is provided in the display housing 78 for displaying the value of the balance weights required and for indicating their relative angular positions on the inner and outer rims of the wheel 3 being balanced. Such display panels will be well known to those skilled in the art, and it is not intended to describe either in further detail. A keypad (not shown) is provided on the display housing 78 for enabling control inputs to be inputted to the electronic circuitry (not shown). Such keypads for wheel balancers will be known to those skilled in the art.

In this embodiment of the invention, the main housing 4 and the sub-housing 15 are sized so that when the sub-housing 15 is in the horizontal position, the rotational axis 17 of the main shaft 14 is at a distance of approximately 725 mm above the ground to facilitate lifting relatively heavy wheels onto the main shaft 14. Needless to say, the height of the rotational axis 17 of the main shaft 14 above the ground may be any desired height, which will in general be determined by ergonomic considerations. However, the height of the main shaft 14 above the ground should be such as to permit easy transfer of a wheel from the ground onto the main shaft 14 by hand.

In use, the method according to the invention for coupling a wheel 3 to be balanced to the main shaft 14 is as follows. The sub-housing 15 is pivoted into the horizontal position. The wheel 3, in a substantially vertical orientation with its rotational axis substantially parallel to the rotational axis 17 of the main shaft 14, and preferably directly below the rotational axis 17, is placed on the ground adjacent the wheel balancer 1, see FIG. 9. The wheel 3 is placed on the ground so that the vertical plane defined by an inner side wall 79 of the tire 43 is spaced apart from the end wall 10 and slightly spaced apart from the free end 58 of the main shaft 14 in a direction extending axially from the main shaft 14, see FIG. 9. The wheel 3 is gripped by hand at the outer rim 73 of the wheel hub 47 with the fingers engaging the rim 73 and the palm of the hand on an outer side wall 77 of the tire 43. The wheel 3 is then lifted from the ground onto the free end 58 of the main shaft 14 by hand, and with a continuous movement of the hand on the outer side wall 77, the sub-housing 15 is pivoted in the direction of the arrow A about the main pivot axis 18 by continuing the upward movement of the hand gripping the wheel 3 until the sub-housing 15 is in the vertical position, see FIG. 10. As the wheel 3 is being engaged on the free end 58 of the main shaft 14, the other hand of the individual not in contact with the wheel 3 is placed on the hand engaging area 69 of the hand plate 68, and as the hand on the wheel 3 commences pivoting of the sub-housing 15 pressure is applied to the hand plate 68 for initially assisting pivoting of the sub-housing 15 from the horizontal position, see FIG. 9. Once the sub-housing 15 has commenced pivoting, the hand on the hand plate 68 may be removed. Once the sub-housing 15 pivots through the midway position, the gas spring 60 and gravity urge the sub-housing 15 into the vertical position. With the sub-housing 15 in the vertical position, the wheel 3, irrespective of its weight and size, can readily easily be accurately co-axially aligned with the rotational axis 17 of the main shaft 14. Gravity assists in locating the central opening 51 in the wheel hub 47 on the cone member 48. On the wheel hub 47 being located on the cone member 48, the clamping member 54 is placed on the free end 58 of the main shaft 14 and is secured by the nut 56 to clamp the wheel 3 in axial alignment with the rotational axis 17 of the main shaft 14. The sub-housing 15 and wheel 3 are pivoted into the horizontal position of the sub-housing 15 by gripping the wheel 3 by hand and pivoting the sub-housing 15 about the main pivot axis 18 in the direction of the arrow B, see FIG. 8. As the sub-housing 15 passes through the midway position in the direction of the arrow B, the action of the gas spring 60 and gravity urge the sub-housing 15 into the horizontal position. The damping mechanism in the gas spring 60 cushions the sub-housing 15 as it pivots into both the vertical and horizontal positions. Where the centre of gravity of the combination of the sub-housing 15 and the main shaft 14 is located between the main pivot axis 18 and the coupler 44, the weight of the combination act to urge the sub-housing 15 into the horizontal position as the sub-housing 15 approaches the horizontal position. Additionally, the weight of the wheel 3 on the main shaft 14 also urges the sub-housing 15 into the vertical and horizontal positions, as the sub-housing 15 is approaching the respective positions.

The wheel 3 is then balanced by rotating the wheel 3 in conventional fashion. Where the wheel balancer i is a manual slow speed wheel balancer, the wheel 3 is rotated by hand up to a speed generally between 50 and 190 revs per minute. The wheel 3 and main shaft 14 are then allowed to coast and to begin to slow down and the electronic circuitry (not shown) computes the value of the balance weights required and the relative angular positions at which they are to be attached to the inner and outer rims of the wheel 3. This information is displayed on the display panel 76.

In the case where the wheel balancer is a high speed wheel balancer, the main shaft 14 is rotated by a motor of the balancer up to the appropriate balancing speed. The electronic circuitry computes the value of the balance weights required and the relative angular positions at which they are to be attached to the inner and outer rims, which information is displayed on the display panels 76.

In the event that the wheel to be balanced is a relatively heavy wheel, the wheel 3 positioned on the ground as already described may be gripped by both hands, the hands being placed on the respective inner and outer side walls 79 and 77, respectively, of the tire 43 of the wheel 3 and the adjacent inner and outer rims of the wheel hub 47. With the wheel 3 gripped by both hands, the wheel is lifted by hand onto the main shaft 14. The hand on the inner wall 79 of the tire 43 is then removed and placed on the hand engaging area 69 of the hand plate 68 which is pressed downwardly, and the hand on the outer side wall 77 of the tire 3 continues the upward movement, thereby pivoting the sub-housing 15 into the vertical position in one substantially continuous movement. In such cases, it is envisaged that the hand on the outer side wall 77 of the tire 43 of the wheel 3 will remain on the outer side wall 77 from the time the wheel 3 is lifted from the ground until the sub-housing 15 and wheel are pivoted into the vertical position of the sub-housing 15. During this action of transferring the wheel 3 from the ground and pivoting the sub-housing 15 into the vertical position, the hand on the outer side wall will move with substantially one continuous movement.

Referring now to FIGS. 11 and 12 there is illustrated a wheel balancer according to another embodiment of the invention indicated generally by the reference numeral 80. The wheel balancer 80 is substantially similar to the balancer 1 and similar components are identified by the same reference numerals. The main difference between this wheel balancer 80 and the wheel balancer 1 is that damping means for damping the sub-housing are it pivots into the vertical and horizontal positions are provided by a pair of hydraulic cushion dampers 81 and 82 which also act as locating means for locating the sub-housing 15 in the vertical and horizontal positions, respectively. One cushion damper 81 is mounted on the end wall 10 of the main housing 4 and engages the base plate 30 of the sub-housing 15 as the sub-housing 15 pivots into the vertical position, illustrated in broken lines in FIG. 11. The other damper 82 is mounted on a mounting bracket (not shown) extending between the front and rear side walls 7 and 8 of the main housing 4 which engages the base plate 30 of the sub-housing 15 as the sub-housing 15 pivots into the horizontal position, illustrated in full lines in FIG. 11. Each damper 81 and 82 comprises a cylindrical housing 83 having a piston (not shown) slidable therein. A connecting rod 84 extends from the piston (not shown) and carries an abutment member 85 for abutting the base plate 30 of the sub-housing 15 in the interior region 11. A compression spring 86 acting between the cylindrical housing 83 and the abutment member 85 urges the abutment member 85 and the connecting rod 84 outwardly of the housing 83.

Any suitable retaining means may be provided for retaining the sub-housing 15 in the vertical and horizontal positions, for example, a gas spring, similar to the gas spring 60 which may be provided without damping means. Alternatively, other suitable spring means or other non-powered biasing means may be provided. It is also envisaged that the sub-housing 15 and the main shaft 14 may be arranged so that their combined centre of gravity whether in combination or otherwise with the weight of the wheel 3 acts as a retaining means for retaining the sub-housing 15 in the respective horizontal and vertical positions by providing respective turning moments on the sub-housing 14 about the main pivot axis 18 for respectively urging the sub-housing 15 into the horizontal and vertical positions.

It is envisaged that instead of hydraulic cushion dampers, pneumatic or friction type cushion dampers could be used.

Referring now to FIG. 13 there is illustrated an alternative damping means for damping movement of the sub-housing 15 as it pivots into the vertical and horizontal positions. This damping means comprises an elastomeric buffer indicated by the reference numeral 87. The elastomeric buffer 87 comprises a base member 88 for mounting the main housing 4 in similar fashion as the cushion dampers are mounted on the main housing 4 of the wheel balancer of FIG. 11. A pair of elastomeric members 89 are bonded to the base member 88 for abutting the base plate 30 of the sub-housing 15 in the interior region 11 as the sub-housing 15 pivots into the vertical and horizontal positions for damping thereof.

Referring now to FIG. 14 there is illustrated portion of a wheel balancer 90 according to another embodiment of the invention. The wheel balancer 90 is substantially similar to the wheel balancer 1 and similar components are identified by the same reference numerals. The main difference between the wheel balancer 90 and the wheel balancer 1 is that the damping means in this embodiment of the invention is provided by a torsional damper/brake 91 which is mounted around the pivot shaft 16. The torsional damper/brake 91 may be arranged to damp movement of the sub-housing 15 as it pivots into the horizontal or vertical position or both. Such torsional damper/brakes will be well known to those skilled in the art, and may be an hydraulic, pneumatic, spring or frictional damper/brake. Needless to say the torsional damper/brake need not act directly around the pivot shaft 16, it may act indirectly if desired.

Suitable retaining means, for example, a gas spring similar to the gas spring 60 may be provided or indeed any other suitable retaining means may be provided for retaining the sub-housing 15 in the respective horizontal and vertical positions.

Referring now to FIG. 15 there is illustrated a wheel balancer according to a further embodiment of the invention indicated generally by the reference numeral 92. The wheel balancer 92 is substantially similar to the wheel balancer 1 and similar components are identified by the same reference numerals. A pair of retaining means for retaining the sub-housing 15 in the respective horizontal and vertical positions are provided. The horizontal and vertical positions of the sub-housing 15 are illustrated in full and broken lines, respectively. The retaining means for retaining the sub-housing 15 in the horizontal position comprises a torsion spring 93 acting around the pivot shaft 16 for urging the sub-housing 15 into the horizontal position. The retaining means for retaining the sub-housing 15 in the vertical position comprises a latch mechanism 94 mounted in the base 5 and extending into the interior region 11 of the main housing 4 for engaging the base plate 30 and retaining the sub-housing 15 in the vertical position on the sub-housing 15 pivoting into the vertical position. The latch mechanism 94 comprises a latch housing 96 and a latch member 95 slidable in the latch housing 96. A compression spring 97 in the housing 96 biases the latch member 95 outwardly of the latch housing 96 for engaging the base plate 30 of the sub-housing 15 when the sub-housing 15 is in the vertical position. The latch member 95 is shaped at 98 to facilitate depression of the latch member 95 into the latch housing 96 by the base plate 30 as the sub-housing 15 is pivoting into the vertical position for clearing the base plate 30. On the sub-housing 15 having pivoted into the vertical position, the latch member 95 is released by the base plate 30 and engages and retains the base plate 30. A release lever (not shown) is provided on the base 5 operably connected to the latch member 95 for withdrawing the latch member 95 into the latch housing 96 to release the sub-housing 15 from the vertical position.

Referring now to FIG. 16, a wheel balancer according to a further embodiment of the invention indicated generally by the reference numeral 100 is illustrated. The wheel balancer 100 is substantially similar to the wheel balancer 1 and similar components are identified by the same reference numerals. The retaining means of the wheel balancer 100 are provided by a tension spring 101 for retaining the wheel balancer 100 in the horizontal position, and a latch mechanism 102 for retaining the sub-housing 15 in the vertical position. The latch mechanism 102 is substantially identical to the latch mechanism 94 of the wheel balancer of FIG. 15. The tension spring 101 acts between the sub-housing 15 and the base 5 for urging the sub-housing 15 into the horizontal position. The latch mechanism 102 operating in similar fashion to the latch mechanism 94 retains the sub-housing 15 in the vertical position as described with reference to the balancer 92 of FIG. 15.

Referring now to FIG. 17 there is illustrated a wheel balancer 105 according to a still further embodiment of the invention. The wheel balancer 105 is substantially similar to the wheel balancer 1 and similar components are identified by the same reference numerals. In this embodiment of the invention a retaining means is provided for retaining the sub-housing 15 in the horizontal position as illustrated in FIG. 17. The retaining means comprises a latch mechanism 106 which is similar to the latch mechanism 94 described with reference to the wheel balancer 92 of FIG. 15. The latch mechanism 106 is mounted on the end wall 9, and the latch member 95 engages the base plate 30 of the sub-housing 15 when the sub-housing 15 is in the horizontal position. The latch member 95 is shaped at 98 to facilitate depression of the latch member 95 into the latch housing 96 as the sub-housing 15 is pivoted into the horizontal position.

Referring now to FIG. 18 there is illustrated a wheel balancer 110 according to a still further embodiment of the invention. The wheel balancer 110 is substantially similar to the wheel balancer 1 and similar components are identified by the same reference numerals. In this embodiment of the invention retaining means for retaining the sub-housing 15 in the horizontal and vertical positions comprises a counter weight 111 mounted on the sub-housing 15 intermediate the main pivot axis 18 of the pivot shaft 16 and the coupler 44. The counter weight 111 is arranged so that its weight acting through its centre of gravity 112 induces a turning moment in the sub-housing 15 about the main pivot axis 18 for urging the sub-housing 15 into the horizontal position, and also the vertical position, as the sub-housing 15 is approaching the respective horizontal and vertical positions. An alternative position for the counter weight 111 is illustrated in broken lines in FIG. 18. When the counter weight 111 is mounted above the sub-housing 15 intermediate the main pivot axis 18 and the coupler 44, the turning moment induced by the counter weight 111 for urging the sub-housing 15 into the vertical position as the sub-housing 15 approaches the vertical position is greater than when the counter weight 111 is mounted below the sub-housing 15 as illustrated in full lines in FIG. 18. Needless to say, the weight of the sub-housing 15 will act to urge the sub-housing 15 into the vertical position as the sub-housing 15 approaches the vertical position. Where the centre of gravity of the combination of the sub-housing 15 and the main shaft 14 is located between the main pivot axis 18 and the coupler 44 the weight of the sub-housing 15 and the main shaft 14 will also act to urge the sub-housing 15 into the horizontal position as the sub-housing 15 approaches the horizontal position. The weight of the wheel will similarly act to urge the sub-housing 15 into the respective horizontal and vertical positions.

While the wheel balancers have been described as comprising a main housing for supporting the sub-housing, any other suitable main support may be used, and indeed, in certain cases, it is envisaged that the main support may be provided by a main framework, instead of by a main housing. Needless to say, any other suitable construction of sub-housing may be used, and furthermore, the shaft support means need not necessarily be provided as a sub-housing. The shaft support means may be provided as a framework or the like.

It is also envisaged that other retaining means besides non-powered biasing means and those already described may be used for retaining the sub-housing in the vertical and/or horizontal positions and/or for urging the sub-housing into the vertical and/or horizontal positions. Where the retaining means is provided by non-powered biasing means, other suitable non-powered biasing means besides a gas spring and those already described may be used. Indeed, in certain cases, as described some of the non-powered biasing means may be provided by a spring, either a compression or a tension spring. It is also envisaged that an hydraulic spring may be used. Furthermore, while it is preferable, it is not essential that the gas spring should be provided with damping means for damping movement of the sub-housing into the vertical and horizontal positions. Furthermore, while the gas spring has been described as being mounted on the front side wall of the main housing, if desired the gas spring may be mounted on the rear side wall of the main housing or any other suitable or desired location. It will be appreciated that while it is preferable, it is not essential that the non-powered biasing means should also act as a retaining means, in certain cases, the non-powered biasing means and retaining means may be provided independently of each other. Furthermore, any other type of locating means may be provided for locating the sub-housing in the vertical and horizontal positions. It is also envisaged that the gas spring may act itself as the locating means for locating the sub-housing in the respective vertical and horizontal positions. In which case, the stroke of the gas spring would be arranged so that when the piston rod was extended fully from the cylinder of the gas spring, the sub-housing would be in the respective horizontal and vertical positions.

It will of course be appreciated that any other mounting arrangement for mounting the main shaft in the sub-housing may be used.

It will of course be appreciated that the damping means may be provided independently of the retaining means.

It will also be appreciated that other suitable coupling means for coupling the wheel with the main shaft may be used.

We claim:

1. A wheel balancer comprising:
   a main support,
   an elongated main shaft having a free end for carrying a wheel to be balanced, the main shaft defining a longitudinally extending shaft axis which forms a rotational axis about which the main shaft is rotatable,
   a coupling means adjacent the free end of the main shaft for coupling a wheel to be balanced with the main shaft, the wheel being mounted with its axis of rotation co-axial with the rotational axis of the main shaft, and
   a shaft support means for rotatably carrying the main shaft, the shaft support means being pivotally mounted on the main support and pivotal about a horizontal main pivot axis extending transversely relative to the rotational axis of the main shaft, the shaft support means being pivotal about the main pivot axis from a horizontal position, with the rotational axis of the main shaft substantially horizontal, to a vertical position, with the rotational axis of the main shaft substantially vertical and the free end of the main shaft extending upwardly of the shaft support means, the main pivot axis being located below the rotational axis of the main shaft when the shaft support means is in the horizontal position, and also being located below the centre of gravity of the combination including the shaft support means and the main shaft when the shaft support means is in the horizontal position, the main shaft being located for enabling a wheel on the ground to be manually transferred onto the main shaft when the shaft support means is in the horizontal position, and the main pivot axis being located for enabling the shaft support means and the main shaft with the wheel mounted thereon to be manually pivoted from the horizontal position to the vertical position, wherein the transfer of the wheel onto the main shaft and the pivoting of the shaft support means can be carried out sequentially and in one substantially continuous movement.

2. A wheel balancer as claimed in claim 1 in which the main pivot axis is spaced apart from the coupling means.

3. A wheel balancer as claimed in claim 1 in which a hand engaging means is provided on the shaft support means for facilitating the manual application of downward pressure to the shaft support means for assisting in the pivoting of the shaft support means from the horizontal position, the hand engaging means being spaced apart from the main pivot axis on the side thereof opposite to that occupied by the coupling means.

4. A wheel balancer as claimed in claim 1 in which a retaining means is provided for retaining the shaft support means in the horizontal position.

5. A wheel balancer as claimed in claim 1 in which a non-powered biasing means for urging the shaft support means into the horizontal position is provided.

6. A wheel balancer as claimed in claim 5 in which the non-powered biasing means is connected between the shaft support means and the main support, the non-powered biasing means providing a turning moment which acts about the main pivot axis to urge the shaft support means into the horizontal position as the shaft support means is approaching the horizontal position.

7. A wheel balancer as claimed in claim 5 in which the non-powered biasing means provides a turning moment which acts about the main pivot axis for urging the shaft support means into the vertical position as the shaft support means is approaching the vertical position.

8. A wheel balancer as claimed in claim 6 in which the turning moment acting on the shaft support means provided by the non-powered biasing means is substantially zero when the shaft support means is in a neutral position, intermediate the horizontal position and the vertical position, and the direction of the turning moment reverses as the shaft support means passes through the neutral position.

9. A wheel balancer as claimed in claim 5 in which the non-powered biasing means is an elastic biasing means.

10. A wheel balancer as claimed in claim 5 in which the non-powered biasing means comprises a gas spring.

11. A wheel balancer as claimed in claim 5 in which the non-powered biasing means forms a retaining means for retaining the shaft support means in the horizontal position.

12. A wheel balancer as claimed in claim 1 in which first and second locating means are provided in the main support for locating the shaft support means in the respective horizontal and vertical positions.

13. A wheel balancer as claimed in claim 1 in which a damping means is provided for damping movement of the shaft support means as the shaft support means moves into the vertical and horizontal positions.

14. A method for rigidly coupling a wheel to be balanced in co-axial alignment with a main shaft of a wheel balancer including
   a main support,
   an elongated main shaft having a free end for carrying a wheel to be balanced, the main shaft defining a longitudinally extending shaft axis which forms a rotational axis about which the main shaft is rotatable,
   a coupling means adjacent the free end of the main shaft for coupling a wheel to be balanced with the main shaft, the wheel being mounted with its axis of rotation co-axial with the rotational axis of the main shaft, and
   a shaft support means for rotatably carrying the main shaft, the shaft support means being pivotally mounted on the main support and pivotal about a horizontal main pivot axis extending transversely relative to the rotational axis of the main shaft, the shaft support means being pivotal about the main pivot axis, from a horizontal position with the rotational axis of the main shaft substantially horizontal, to a vertical position with the rotational axis of the main shaft substantially vertical and a free end of the main shaft extending upwardly of the shaft support means, the main pivot axis being located below the rotational axis of the main shaft when the shaft support means is in the horizontal position, and also being located below the centre of gravity of the combination including the shaft support means and the main shaft when the shaft support means is in the horizontal position, the method comprising the steps of:

pivoting the shaft support means of the wheel balancer into a horizontal position with the main shaft extending horizontally, manually transferring the wheel from the ground onto the main shaft, manually pivoting the shaft support means, with the wheel on the main shaft, from the horizontal position to a vertical position with the free end of the main shaft extending vertically upwardly, the transfer of the wheel onto the main shaft and the pivoting of the shaft support means from the horizontal position to the vertical position being carried out sequentially and in one substantially continuous movement, and securing the wheel on the main shaft using the coupling means while the shaft support means is in the vertical position.

15. A method as claimed in claim 1 which further comprises the step of manually applying a downward pressure to a portion of the shaft support means on the side of said main pivot axis opposite said free end of the main shaft for assisting the pivoting of the shaft support means from the horizontal position to the vertical position.

16. A method as claimed in claim 14 which further comprises the step of manually pivoting the shaft support means, with the wheel coupled to the main shaft, from the vertical position to the horizontal position for balancing of the wheel.

* * * * *